Sept. 20, 1938.  E. A. JANKE  2,130,646
MERCHANDISING PACKAGE
Filed July 12, 1935   2 Sheets-Sheet 2
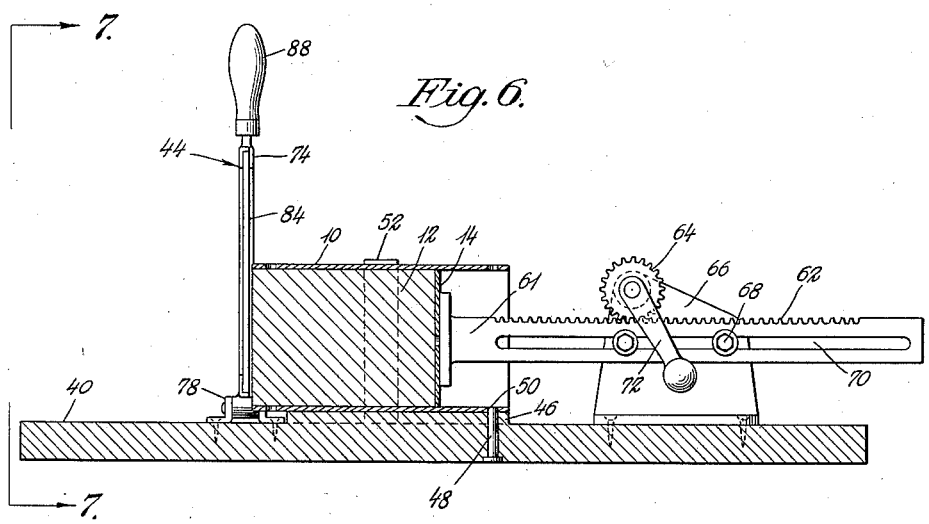
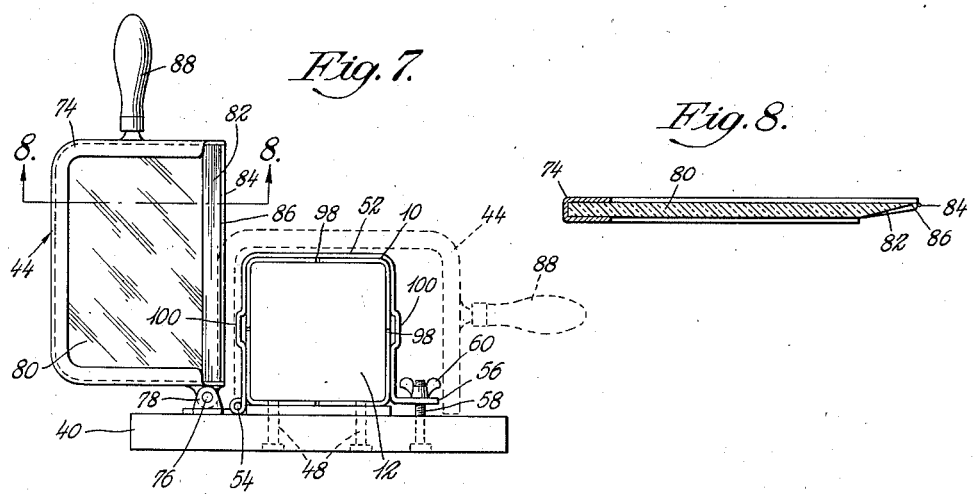
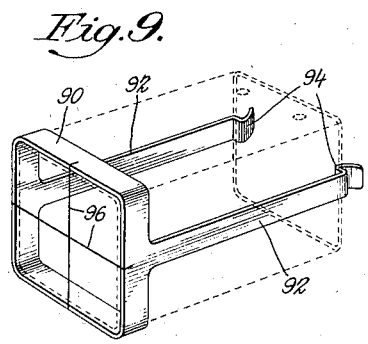
Everett A. Janke.
INVENTOR
BY Victor J. Evans & Co.
HIS ATTORNEYS Patented Sept. 20, 1938

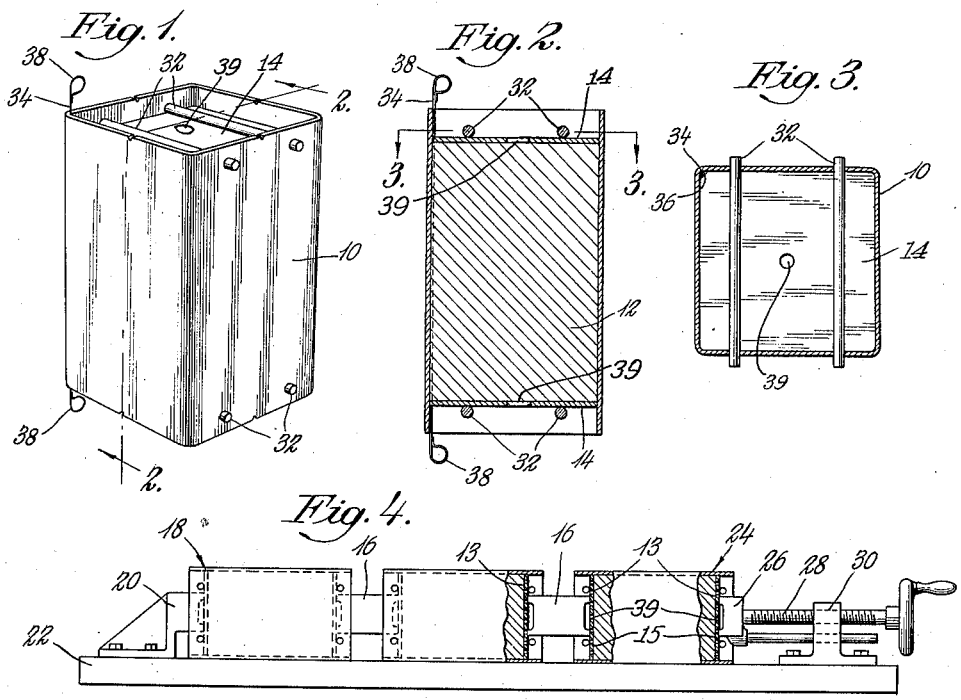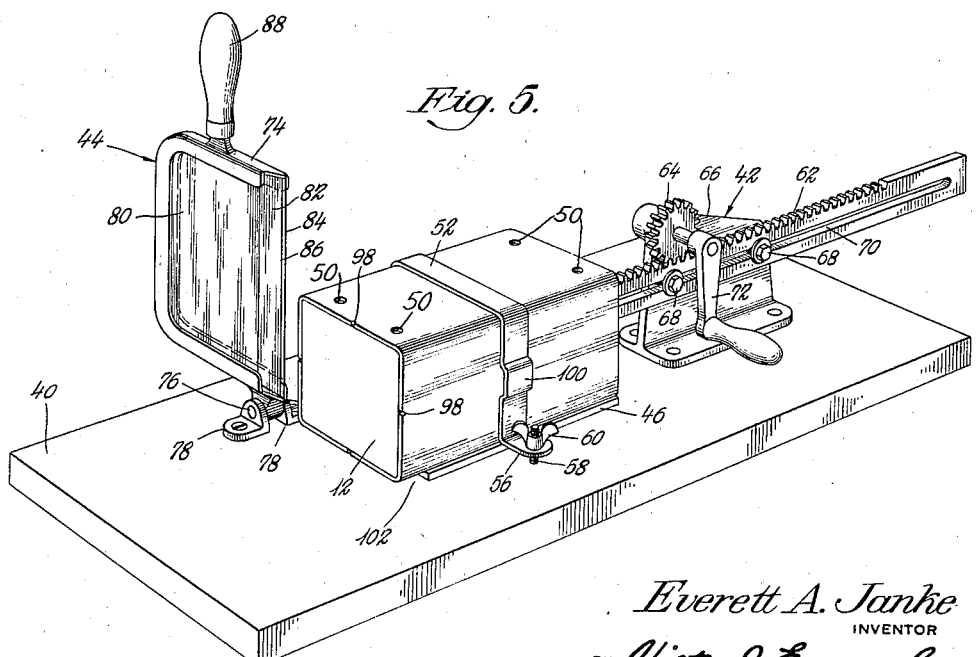

2,130,646

UNITED STATES PATENT OFFICE 2,130,646

MERCHANDISING PACKAGE

Everett A. Janke, Monroe, Wis.

Application July 12, 1935, Serial No. 31,115

6 Claims. (Cl. 31—20)

My invention relates to the manufacture, transportation, and merchandising of food products, such as cheese.

An object of my invention is to provide a novel cheese form adapted to be employed as a transportation and merchandising package for the cheese.

Another object is to provide a novel mechanism co-operating with the cheese filled form for merchandising the cheese in small quantities, and in which the original cheese form may be employed as a displaying device.

A further object is to provide a merchandising package capable of withstanding rough usage, and in which the necessity for conventional wrappers is eliminated.

A further object is to provide a novel method and means for loosening the cheese in its container, to permit the cheese to be extruded therefrom.

A further object is to provide a novel means for extruding cheese from its container and cutting the extruded cheese into smaller pieces, and in which the cutting mechanism embodies transparency for display purposes and functions as a seal for the container.

A further object is to provide a form suitable for pressing cheese in association with a group of similar forms, and in which the closure for the forms functions as a part of the pressing mechanism.

Another object is to provide a novel attachment for the cheese container, whereby the extruded cheese may be severed longitudinally in addition to transverse severance.

Another object is to provide a merchandising package and a co-operating severing mechanism, whereby the cheese may be cut into shapes of regular configuration.

Another object is to provide a package embodying a protective function for the cheese, whereby waste due to dehydration is eliminated.

In the accompanying drawings:

Fig. 1 is a perspective view of the cheese container;

Fig. 2 is a sectional view along the line 2—2 of Fig. 1;

Fig. 3 is a sectional view along the line 3—3 of Fig. 2;

Fig. 4 is a view illustrating a number of cheese containers arranged for pressing the cheese;

Fig. 5 is a perspective view of the transverse cutter;

Fig. 6 is a longitudinal sectional view of the structure of Fig. 5;

Fig. 7 is an end view taken from the position indicated by line 7—7 of Fig. 6;

Fig. 8 is a sectional view along the line 8—8 of Fig. 7; and

Fig. 9 is a perspective view of the cutter for making longitudinal severance of the extruded cheese.

In the embodiment selected to illustrate my invention, I make use of a metallic container 10 of rectangular configuration in cross-section, and of uniform cross-sectional dimensions from end to end. The metal of the container embodies non-corrodible properties, and the shape of the container provides a minimum displacement within a stacked arrangement of units.

In filling the container 10 with the cheese 12, the containers are arranged in spaced end to end relation according to Fig. 4. Each container is provided with a predetermined quantity of cheese, after which perforated cover plates 13 are positioned within each end of the container. These perforations are closely spaced and of small diameters, and function to provide drainage for the moisture content in the cheese being pressed.

Blocks 16 are positioned between the covers 13, while one cover 13 of the container 18 is pressed against an abutment 20 carried by a supporting structure 22. The cover 13 associated with the outer end of the end unit 24 is arranged in alignment with a pressure head 26 associated with a screw 28 having threaded relation with a block 30 bolted to the structure 22 in the same way as the abutment 20.

Pressure applied to the container unit 24 is transmitted uniformly to all the units. The blocks 16 have ends positioned at right angles to the longitudinal axis so that the covers 13 will be accurately aligned at right angles to the longitudinal axis of the containers 10. In Fig. 1, I illustrate the container 10 as being provided with two holes 50 in each end of two opposite walls for the reception of fastening bars 32. After the cheese has been pressed through the medium of the mechanism of Fig. 4, covers 13 are removed and covers 14 are placed in the containers and the rods 32 slipped in place. These covers fit snugly in the containers.

After the covers 14 have been made secure, the cheese is sealed by applying sealing material around the edges of the covers and the adjacent areas of the containers. At the time the cheese is placed in the container for pressing purposes, a small wire 34 is placed in one corner of the container 10. Each cover 14, as well as each cover 13, is cut away slightly at 36 for accommodating the wire, and the ends of the wire project beyond the ends of the container and are provided with grip elements in the nature of loops 38. The cheese 12 may be loosened within the container 10 for extrusion purposes by removing the covers 14 and pulling the wire around the walls of the container. Each of both types of covers is provided with a central opening 39 for the reception of a hook to facilitate removal.

In dispensing the cheese, the container 10 is mounted upon a table 40 carrying an extrusion mechanism 42 and a severing device 44. I provide the table 40 with an elevated floor 46 upon which the container 10 rests. In Figs. 6 and 7, the table 40 is provided with two pins 48 extending upwardly therefrom to be positioned within two of the holes 50 in one end of the container, which holes receive the bars 32 for holding the covers 14 in place. Thus, the pins 48 prevent longitudinal shifting of the container while the cheese is being extruded.

I provide a loop 52 for encircling the container, which loop has one end 54 pivotally connected with the table and the opposite end provided with a perforated extension 56 for the reception of a bolt 58, whereby the loop may be drawn firmly against the container by a nut 60. In tightening the nut 60, the container 10 is clamped firmly upon the floor 46.

Referring to Fig. 6, a plunger 60 bears against the one plate 14 in the container 10, which plunger is provided with a rack 62 arranged in mesh with a gear 64 rotatably carried by a bracket 66 screwed to the floor 40. Two bolts 68 extend through a slot 70 in the plunger 60 for guiding purposes. The gear 64 is operated through the medium of a crank 72.

After the desired amount of cheese has been extruded, the projecting portion may be severed by means of the cutter 44. This cutter includes a metallic frame 74 pivotally connected at 76 with brackets 78 mounted upon the table 40. The frame 72 is channel-shaped in cross section for the reception of a glass plate 80 having a beveled edge 82.

A cheese severing wire 84 has its ends connected with the frame 74 and lies in close relation with the edge 86 of the beveled edge 82. A grip 88 is connected with the frame 74 to facilitate operation of the cutter.

The plate 80 lies snugly against the end of the container 10 in the dotted line position of the cutter in Fig. 7. Thus, the plate 80 performs a sealing function with respect to the container 10 in addition to embodying transparency, whereby the contents of the container may be observed. No severing action is performed by the plate 80. The cheese is completely severed by the wire 84. The wire makes a clean cut, and moves through the cheese with very little resistance. I provide the bevel 82 because of the thickness of the plate 80, so that the beveled edge follows the wire into the slot cut by the wire.

I provide means for making longitudinal cuts. This means includes a metallic loop 90 conforming to the cross sectional configuration of the container 10 and fitting snugly about one end of the container. Two metallic extensions 92 are connected with the loop 90, each having an offset part 94 arranged to fit over the ends of two walls of the container 10. The extensions 92 embody sufficient flexibility to permit quick and easy connection and separation between the parts 94 and the ends of the container.

With the hook parts 94 in the position of Fig. 9, the two severing wires 96 attached to the band 90 lie within small recesses 98 in the end of the container 10. Thus, the wires 96 lie within the contour of the container so as not to interfere with the close fitting relation between the plate 80 and the end of the container. The two wires 96 cut the extruded cheese into four parts. Of course, any desirable number of wires may be connected with the band 90 for cutting the cheese into pieces of various sizes and shapes.

Referring to Figs. 5 and 7, the loop 52 includes offset parts 100 for the reception of the extensions 92. Accordingly, the severing device of Fig. 9 may be associated with an assembly according to Fig. 5, whereby transverse and longitudinal cuts may be made without rearranging the equipment. In Fig. 5, I illustrate the container 10 as extending beyond the floor 46 to provide space 102 between the container and the table 40 for accommodating the band 90 in the clamped position of the container.

Fig. 1 illustrates the container 10 made up as a merchandising package. The package is of durable construction so as to withstand rough usage in stacking and transportation. Because of the rectangular shape of the container, close nesting is attained and the units balance well. My container permits processing and merchandising of the cheese in the original package and eliminates the necessity for special wrappings in the nature of cloth and paper, as is common practice. In addition, the package prevents dehydration of the contents. The contents are easily loosened within the container by merely removing the bars 32 and the cover plate 14 and pulling the wire around the walls of the container.

In pressing some types of cheese in which there is a small moisture content, a slight clearance between the covers 14 and the walls of the container is sufficient for drainage purposes, in which case the covers 14 comprise part of the pressure mechanism. In cases where the covers 14 are substituted during the pressing stage, the covers are heated and pressed firmly against the cheese prior to the insertion of the bars 32. In placing the bars in position with the covers 14 under pressure, the bars are made secure through the expanding pressure of the cheese.

An application of sealing material around the edges of the covers 14 provides an airtight container, while the latter provides a sanitary merchandising package.

While I have described the use of the equipment in connection with cheese, it will be understood that the mechanism is equally applicable to the manufacture and merchandising of other food products such as butter and various types of meat, etc.

In lieu of placing the wire 34 in position prior to the pressing operation, the cutting wire may be subsequently placed by threading the wire through the container by means of a suitable needle.

Without further elaboration, the foregoing will so fully explain my invention that others may, by applying current knowledge, readily adapt the same for use under various conditions of service.

I claim:

1. The combination with a supporting table, of a tubular food casing having an opening in its wall, means carried by the table and extending into said opening for resisting movement of the casing, a cover arranged loosely within one end of the casing, a pressure device for moving the cover inwardly, to extrude the food product from the other end of the casing, a severing device arranged at said other end of the casing, said severing device including a frame having a cutting wire, and a transparent pane carried by said frame and arranged to lie against the end of the tubular casing for sealing the same.

2. A device of the type described comprising an open ended casing rectangular in cross section, certain walls of the casing being provided with openings, covers fitting loosely within the open ends, bars extending across the outer faces of said covers and positioned within said openings; a supporting table, pins extending upwardly from the table, said pins being arranged to extend within certain of the openings in said casing when the bars are removed, a pressure device carried by said table and arranged to engage one of said covers for extruding the contents of the casing; a cutter for severing the extruded material transversely of the casing, said cutter including a frame having a cutting wire, a transparent closure member carried by said frame and arranged to extend across the end of the casing in sealing relation therewith; means for severing the extruded contents longitudinally of the casing, said means including a band encircling the casing and severing wires extending across the end of the casing, extensions carried by said band and having abutments arranged to engage one end of the casing for holding the band in position; and a clamp co-operating with said table for drawing the casing into firm engagement therewith, to prevent disconnection of the casing from said pins.

3. A food severing device of the type described comprising a pivotally mounted frame, a glass plate carried by said frame and having a beveled edge, and a cutting wire carried by said frame in operative relation with said beveled edge.

4. The combination with a supporting table, of a tubular food casing, means for fixedly connecting the tubular food casing with the table, a cover arranged loosely within one end of the casing, a pressure device for moving the cover inwardly, to extrude the food product from the other end of the casing, a severing device arranged at said other end of the casing, said severing device including a frame having a cutting wire, and a transparent pane carried by said frame and arranged to lie against the end of the tubular casing for sealing the same.

5. A device of the type described comprising an open ended casing having openings in its wall, covers fitting loosely within the open ends, bars extending across the outer faces of said covers and positioned within said openings, a supporting table, means for fixedly connecting the casing with the table, a pressure device carried by said table and arranged to engage one of said covers for extruding the contents of the casing, a cutter for severing the extruded material transversely of the casing, said cutter including a frame having a cutting wire, a transparent closure member carried by said frame and arranged to extend across the end of the casing in sealing relation therewith, means for severing the extruded contents longitudinally of the casing, said means including a band inserted in the casing and severing wires extending across the end of the casing, and extensions carried by said band and having abutments arranged to engage the end of the casing for holding the band in position.

6. A food severing device of the type described comprising a movably mounted frame, a glass pane carried by said frame, and a cutting wire carried by said frame near one edge of said glass pane.

EVERETT A. JANKE.